United States Patent
Diao et al.

(10) Patent No.: US 7,707,345 B2
(45) Date of Patent: Apr. 27, 2010

(54) METHODS AND APPARATUS FOR MANAGING DEADTIME IN FEEDBACK CONTROL QUEUING SYSTEM

(75) Inventors: Yixin Diao, White Plains, NY (US); Sujay Parekh, New York, NY (US); Maheswaran Surendra, Croton-on-Hudson, NY (US); Ronghua Zhang, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/431,995

(22) Filed: May 11, 2006

(65) Prior Publication Data

US 2006/0259905 A1 Nov. 16, 2006

Related U.S. Application Data

(60) Provisional application No. 60/680,564, filed on May 13, 2005.

(51) Int. Cl.
*G06F 13/40* (2006.01)

(52) U.S. Cl. .............. 710/307; 710/310; 710/104; 710/58

(58) Field of Classification Search ......... 710/305–309, 710/310, 104, 25, 45, 54, 58; 709/104
See application file for complete search history.

(56) References Cited

U.S. PATENT DOCUMENTS

| 6,442,550 | B1 * | 8/2002 | Rajamony | 707/10 |
| 6,704,489 | B1 * | 3/2004 | Kurauchi et al. | 386/46 |
| 2002/0007389 | A1 * | 1/2002 | Jones et al. | 709/104 |
| 2005/0022173 | A1 * | 1/2005 | Kanade | 717/140 |
| 2005/0076339 | A1 * | 4/2005 | Merril et al. | 718/104 |
| 2005/0223150 | A1 * | 10/2005 | Ohmoto et al. | 710/309 |
| 2007/0105503 | A1 * | 5/2007 | Kim | 455/70 |

OTHER PUBLICATIONS

P. Barford et al., "Generating Representative Web Workloads for Network and Server Performance Evaluation," Measurement and Modeling of Computer Systems, pp. 151-160, 1998.

L. Benmohamed et al., "Feedback Control of congestion in Packet Switching Networks: The Case of a Single Congested Node," IEEE Transactions on Networking, vol. 1, No. 6, pp. 693-708, Dec. 1993.

J.C.R. Bennett et al., "WF$^2$Q: Worst-Case Fair Weighted Fair Queueing," Proceedings of IEEE Infocom, 9 pages, 1996.

(Continued)

*Primary Examiner*—Thomas J Cleary
*Assistant Examiner*—Kim T Huynh
(74) *Attorney, Agent, or Firm*—Kenneth R. Corsello; Ryan, Mason & Lewis, LLP

(57) ABSTRACT

Techniques for managing feedback control systems are provided. By way of example, a method of controlling performance of a managed system by a controller includes the following steps/operations. The controller issues a control value to the managed system to affect a performance of the managed system. The controller maintains a measurement time period having a variable start time within which the performance of the managed system is measured, such that the control value is given time to take effect on the managed system and a performance metric fed back to the controller from the managed system reflects the effect of the control value on the managed system.

8 Claims, 8 Drawing Sheets

OTHER PUBLICATIONS

N. Bhatti, "Web Server Support for Tiered Services," IEEE Network, pp. 1-16, Sep. 1999.

A. Demers et al., "Analysis and Simulation of a Fair Queueing Algorithm," ACM Sigcomm, pp. 1-12, 1989.

A. Elwalid et al., "Design of Generalized Processor Sharing Schedulers Which Statistically Multiplex Heterogeneous QoS Classes," Proceedings of IEEE Conference on computer Communications (Infocom), 11 pages, Mar. 1999.

S.J. Golestani, "A Self-Clocked Fair Queueing Scheme for Broadband Applications," Proceedings of IEEE Infocom, pp. 636-646, 1994.

P. Goyal et al., "Start-Time Fair Queuing: A Scheduling Algorithm for Integrated Services Packet Switching Networks," Proceedings of ACM Sigcomm, pp. 1-12, 1996.

A.G. Greenberg, "How Fair is Fair Queuing?," Journal of the Association for Computing Machinery, vol. 39, No. 3, pp. 568-598, Jul. 1992.

C.V. Hollot et al., "A Control Theoretic Analysis of RED," Proceedings of IEEE Infocom, pp. 1-10, 2001.

C.V. Hollot et al., "On Designing Improved Controllers for AQM Routers Supporting TCP Flows," Proceedings of IEEE Infocom, pp. 1-9, 2001.

V. Kanodia, "Mutli-Class Latency Bounded Web Services," 8th International Workshop on Quality of Service, 39 pages, 2000.

S. Keshav, "A Control-Theoretic Approach to Flow Control,"ACM Sigcomm, pp. 3-15, 1991.

K. Kumaran et al., "Novel Techniques for the Design and Control of Generalized Processor Sharing Schedulers for Multiple QoS Classes," Proceedings of IEEE Conference on Computer Communications, Infocom, pp. 1-10, Mar. 2000.

C. Lu et al., "A Feedback Control Architecture and Design Methodology for Service Delay Guarantees in Web Servers," IEEE Real-Time Technology and Applications Symposium, pp. 1-23, Jun. 2001.

Y. Lu et al., "An Adaptative Control Framework for QoS Guarantees and Its Application to Differentiated Caching Services," 10th International Workshop on Quality of Service, 10 pages, May 2002.

Y. Lu et al., "Feedback Control with Queueing—Theoretic Prediction for Relative Delay Guarantees in Web Servers," 10 pages, IEEE Real-Time and Embedded Technology and Application Symposium, 10 pages, 2003.

Y. Lu et al., "Differentiated Caching Services: A Control-Theoretical Approach," IEEE, International Conference on Distributed Computing Systems, pp. 615-622, Apr. 2001.

A.K. Parekh et al., "A Generalized Processor Sharing Approach to Flow Control in Integrated Services Networks: The Single-Node Case," IEEE/ACM Transactions on Networking, vol. 1, No. 3, pp. 344-357, Jun. 1993.

S. Parekh et al., "Using Control Theory to Achieve Service Level Objectives in Performance Management," Real Time System Journal, vol. 23, No. 1-2, 2002.

P. Pradhan et al., "An Observation-Based Approach Towards Self-Managing Web Servers," Tenth International Workshop on Quality of Service, 10 pages, 2002.

L. Sha et al., "Queueing Model Based Network Server Performance Control," Proceedings of the 23rd IEEE Real-Time Systems Symposium (RTSS), 10 pages, 2002.

* cited by examiner (A)

ADAPTATION INTERVAL 60s WITH SINGLE FILTER (B)

ADAPTATION INTERVAL 60s WITH SEPARATE FILTERS

METHODS AND APPARATUS FOR MANAGING DEADTIME IN FEEDBACK CONTROL QUEUING SYSTEM

CROSS REFERENCE TO RELATED APPLICATION

The present application claims priority to the U.S. provisional application identified by Ser. No. 60/680,564, filed on May 13, 2005, and entitled "Managing Dead-Time in Feedback Control Queuing Systems," the disclosure of which is incorporated by reference herein.

FIELD OF THE INVENTION

The present invention relates to feedback control systems and, more particularly, to techniques for managing performance of such systems.

BACKGROUND OF THE INVENTION

Performance management of a computing system is one example of a feedback control system. Most performance management systems make resource management and allocation decisions based on feedback of performance metrics. More particularly, a resource manager component of the performance management system submits a resource action to the computing system being managed (the managed system), in response to the performance metric feedback information. The resource action is typically intended to affect the performance of the managed system.

Herein, we consider resource actions where there is some a-priori unknown delay between the time that the resource action is submitted by the resource manager and the time that it takes effect in the managed system. Such a delay is typically caused by queuing or buffering in the managed computing systems. As a result, the effect of the resource action is not visible in the feedback metrics for an unknown period of time.

Such unknown or unmodeled delays can be dangerous from the point of view of a feedback-based control system. In particular, well-known linear control theory suggests that adding delays to a feedback loop can make the system unstable. Intuitively, this happens because the controller (in particular, the resource manager) may over-react because the effects of its control actions may not show up in the feedback metric in a timely fashion. Such over-reactions can, in the best case, lead to a poorly-performing controller which is not able to meet its performance objectives effectively. For example, the performance metric (e.g., response time) may oscillate over a wide range around the desired value rather than being stable at the desired value. In the worst-case, the closed-loop system may be unstable, which typically results in the well-known limit cycle behavior. Here, the resource actions oscillate between the maximum and minimum resource setting, and the performance metric shows a very undesirable thrashing behavior.

When delays can be known or modeled, designers of control (or resource management) algorithms can redesign the controller so as to take such delays into account. However, when faced with unknown delays, designers must make their systems slow enough so that the effects of delay are not visible. For example, if the control delays are in the seconds range, one may choose to change the resource settings only once every few minutes, thus making the delay a negligible aspect. One limitation of this approach is that by limiting the control frequency, one loses the ability to adapt quickly to changing scenarios. Further, it is possible to encounter situations where the actual delay exceeds the values for which the resource manager is designed.

SUMMARY OF THE INVENTION

Principles of the invention provide techniques for managing deadtime in feedback control systems.

By way of example, in one aspect of the invention, a method of controlling performance of a managed system by a controller includes the following steps/operations. The controller issues a control value to the managed system to affect a performance of the managed system. The controller maintains a measurement time period having a variable start time within which the performance of the managed system is measured, such that the control value is given time to take effect on the managed system and a performance metric fed back to the controller from the managed system reflects the effect of the control value on the managed system. The time that it takes the issued control value to take effect on the managed system may be referred to as deadtime.

In one embodiment, the managed system includes at least one queue. The maintaining step/operation may further include marking a request at a tail end of the queue when the control value is issued by the controller, starting the measurement time period when the marked request reaches a head end of the queue, and reporting the performance metric, computed during the measurement time period, to the controller at the end of the measurement time period. The marking, starting and reporting steps may be repeated for a new control value generated by the controller.

In another embodiment, the controller ignores any performance metrics fed back to the controller between the time when the control value is issued by the controller and the time when the control value takes effect on the managed system.

In yet another embodiment, the maintaining step/operation further includes determining the variable measurement start time based on a computation which is a function of a length of the queue when the control value is issued and a time to process requests that contribute to the length.

By way of further example, in another aspect of the invention, a method of managing one or more queuing elements associated with a class includes the following steps/operations. A current length of each of the one or more queuing elements associated with the class is recorded when a weight associated with the class is changed. A time period is waited before the weight associated with the class is changed again. The waiting time period is a combination of a variable time period for requests attributed to the current length of each of the one or more queuing elements to be cleared and a fixed adaptation time period. In one embodiment, the one or more queuing elements include one or more fair queuing (FQ) elements.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the invention will be described below in the context of performance management in computing systems and, more particularly, in the situation where there is some a-priori unknown delay between the time that a resource action is submitted by a resource manager and the time that it takes effect in the managed system. However, it is to be appreciated that principles of the invention are more generally applicable to any feedback control of a queuing system.

Illustrative principles of the invention presuppose that the cause of the delay is due to queuing in the managed system, and further that it is known which queue is the cause. In one illustrative embodiment of the invention, the queue is a first-in-first-out (FIFO) queue. In this case, one technique is to estimate the time required for processing the entries that are already in the queue at the time that the change in allocation is made (i.e., at the time the resource action or control value is submitted by the resource manager). By waiting for this amount of time before computing any performance metric (or discounting the metric during this interval), one can be assured that the new measurement does not include the deadtime. The deadtime is the time period starting from when the resource action is submitted by the resource manager and ending when the resource action takes effect in the managed system.

It is to be understood that such techniques may be applied to other types of queues. For example, implementations in accordance with a fair queuing (FQ) element will be described below in the context of FIGS. 3 through 15.

One advantage of this inventive approach is its overall simplicity. In the face of unknown delays, designers must either reduce the controller's responsiveness or they must use more advanced but less robust control techniques. In comparison, the inventive approach allows the designer to continue to use a basic design methodology as if the delay were not present. Moreover, implementing this feature requires minimal overhead in terms of new infrastructure that must be added, or measurement overhead. Thus, one can still design a fairly responsive and aggressive control system without suffering the negative instability or poor performance that is mentioned above.

Figure 1:
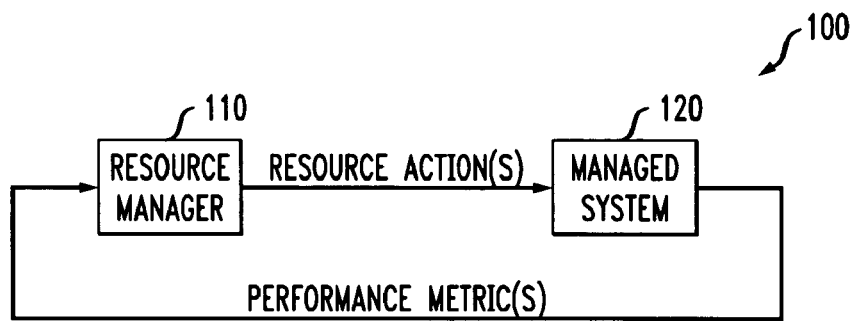
FIG. 1 illustrates a feedback control system in which techniques of the invention can be implemented.
Figure 2:
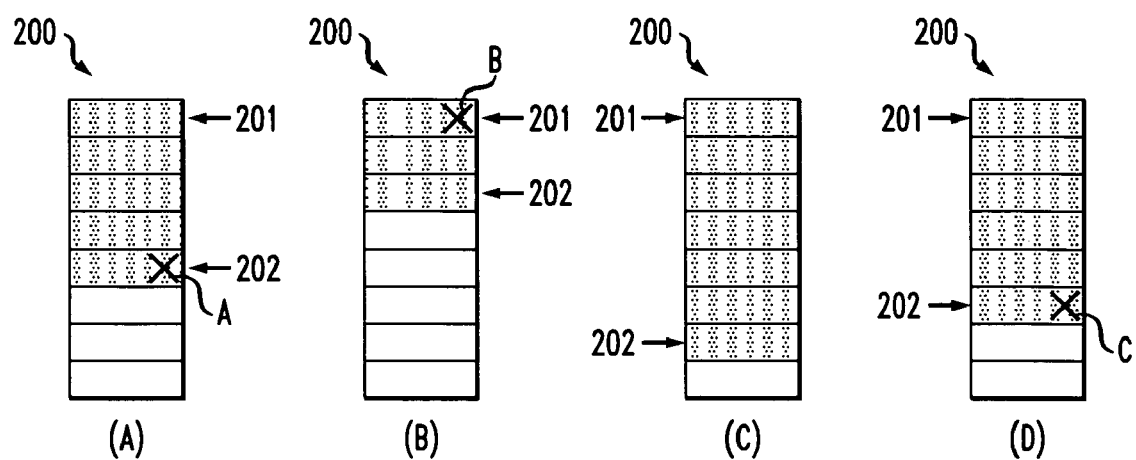
FIGS. 2A through 2D illustrate a feedback control technique in the context of a FIFO queue, according to an embodiment of the invention.

FIG. 1 illustrates a feedback control system in which techniques of the invention can be implemented. As shown, feedback control system 100 includes resource manager 110 operatively coupled to managed system 120.

Resource manager 110 is a controller which makes resource management and allocation decisions (also called control decisions) and then issues one or more resource actions (control values) based on feedback of one or more performance metric(s) from managed system 120.

In one embodiment, managed system 120 includes one or more computing servers. Each server may maintain one or more processing queues such that processing requests are handled in an orderly fashion. Such requests may correspond to client (not shown) requests and/or requests generated from within the server. The performance of servers depends on the flow of requests through these queues as they pass through a series of stages or tiers at which they are queued for service. Resource manager 110 acts as a feedback controller designed to achieve a desired end-to-end performance by manipulating the behavior of individual queuing elements in the servers.

We consider a scenario where control decisions are to be made at fixed intervals, which are called control intervals. Typically, the feedback metric represents an average or aggregate performance over a period equal to the control interval, which is called the measurement period or measurement interval.

When the control decision is made, consider the queue which causes the effects of this action to be delayed. The queue has some existing entries at the time the decision is made. The delay in having this new control value (resource action) take effect is due to the time to drain these requests from the queue. While the invention is not limited to use with any particular control value, some examples of control value may include scheduling weights (as will be described below in the context of a fair queuing embodiment), memory sizes, and bandwidth allocation.

In accordance with illustrative principles of the invention, in order to account for this delay, the resource manager tags (marks) the request which was at the end of the queue when the control action was issued. When this request is removed from the queue for processing by the managed system (i.e., server), the true measurement period begins.

In accordance with another embodiment, the delay can be accounted for by the resource manager first measuring the length of the queue at the time that the control decision is made. Second, the resource manager measures the average time for which queue entries are in the queue. By a simple multiplication of these two values (i.e., queue length multiplied by average queue residency time), we can compute the delay that will be encountered for having the new control decision take effect. In an alternative calculation, the delay may be computed as the queue length divided by the entry processing rate.

Accordingly, the resource manager ignores or discounts the performance metric during this interval; otherwise the metric is not measuring the true effect of the new control value.

Advantageously, an illustrative embodiment of the invention adds only the following operations to an existing performance management system: (1a) tagging of requests as they enter and leave the system or (1b) measurement of the average residency time for the entries in the queue (which is often already available, and if not, easily added); (2) modifying the measurement to ignore the data that happens during the deadtime; and (3) modifying the controller to wait for the sensor data before computing a new control value.

Thus, the resource manager effectively maintains a measurement time period which has a variable start time. In this way, the performance metric fed back to the resource manager from the managed system reflects an effect of the resource action on the managed system.

FIGS. 2A through 2D illustrate the technique in the context of a FIFO queue. The figures illustrate the operational sequence through queue 200 having a head end 201 and a tail end 202. In accordance with a FIFO arrangement, a request is enqueued at the tail end of the queue and dequeued once it reaches the head end.

In the step represented by FIG. 2A, at the time when the controller (resource manager 110) issues a new control value (resource action), the request at the tail end of the queue is marked (denoted by reference letter A). Marking may be done by the controller or the managed system, itself.

In the step represented by FIG. 2B, at the time when the marked request is dequeued for processing, i.e., when the request reaches the head end of the queue (denoted by reference letter B), the measurement period (interval) begins.

In step represented by FIG. 2C, at the end of the measurement period (e.g., same length as a control period), the performance metric (e.g., average response time or average throughput) is reported back to the controller.

In the step represented by FIG. 2D, the controller calculates and issues a new control value. At that time, the request at the tail end of the queue is marked (denoted by reference letter C). Then, the process repeats.

In comparison, a conventional control scheme has a fixed control interval, which is the same as the measurement period (or an integral multiple thereof). Thus, every measurement period, a value is reported back and a new control value is calculated. In contrast, illustrative principles of the invention use a fixed measurement period, but due to the variable-length deadtime elimination period (the time between the step represented by FIG. 2A and the step represented by FIG. 2B), the control interval is now no longer identical to the measurement period.

Illustrative principles of the invention will now be explained in accordance with a fair queuing (FQ) embodiment.

It is realized that while FIFO type queuing is an important type of queuing architecture, quality-of-service (QoS) aware servers are beginning to utilize more sophisticated types of queues, such as priority queues and FQ elements.

Accordingly, analyzing the behavior of FQ elements is particularly important. Most multi-class feedback control schemes proposed for computing servers to date achieve performance guarantees by logically allocating a separate fraction of the server's bottleneck resource to each traffic class. The extent of each share is controlled to provide the desired performance. Unfortunately, unlike disk space and memory, many resources (such as a disk head, a communication channel, or a central processing unit) cannot be physically partitioned. Instead, the abstraction of resource shares has to be enforced by an appropriate scheduling policy that allows different applications to believe they own a different fraction of resource bandwidth. Among the most common scheduling policies that achieve this end are those based on virtual clocks such as variants of FQ. These policies seek to approximate Generalized Processor Sharing (GPS) and thus the resource shares allocated to different classes are determined by assigning appropriate weights to each class.

The behavior of FQ and similar disciplines in terms of providing service differentiation and delay and jitter guarantees has been analyzed, along with flow control strategies in networks of such FQ elements. In order to use FQ for end-user QoS, however, the user-level QoS requirement must be used to correctly set the per-class weights as used by the FQ scheduler. The effects of closing a feedback loop around FQ queues for such QoS have not been systematically explored.

In accordance with principles of the invention, we systematically analyze the effects of closing a control loop around a FQ element for setting the per-class weights. We show that understanding the behavior of this category of schedulers is crucial to allow feedback control loop designers to properly account for the side effects introduced by virtual clocks. The performance of a simple feedback loop is shown to be very poor and often unstable. The sources of performance degradation and instability are analyzed, understood, and methodically eliminated, leading to a general methodology for feedback control loop design of FQ elements. The extended design is tested on a real Web application, demonstrating an order of magnitude improvement in loop responsiveness over the baseline solution.

While our experimental studies are in the context of multi-class Web traffic, the issues considered are more generally applicable for any usage of FQ where the weights are changed dynamically.

Figure 3:
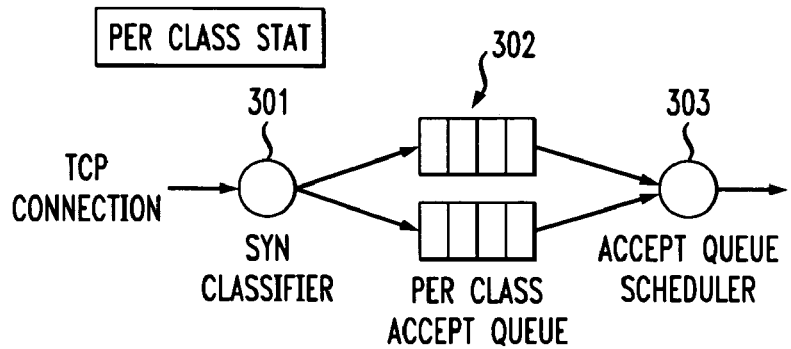
FIG. 3 illustrates a fair queuing-based system, according to an embodiment of the invention.

The running example of the FQ system in this embodiment is a self-managing web server in which multiple classes of clients must achieve their respective average response time goal. As shown in FIG. 3, incoming connection requests (TCP SYN packets) are first classified by SYN classifier 301. The classifier uses the Internet Protocol (IP) address and port number to classify the incoming connection requests into different service classes based on rules. Once the three-way handshake is complete, the connection is moved from the SYN queue to the accept queue of the listening socket. Rather than a single FIFO queue shared by all classes of clients as in a normal Linux kernel, a separate accept queue 302 for each class is maintained. Requests are subsequently dequeued by threads, which in turn get enqueued for the central processing unit (CPU) of the server. Depending on the nature of such requests, either the Transport Control Protocol (TCP) accept queues or the CPU could become the bottleneck. In this embodiment, we focus on the accept queue bottleneck, which is often seen with a large number of HyperText Transport Protocol (HTTP) requests using the HTTP/1.1 persistent connection option. Observations and results regarding control of FQ elements holds for the CPU bottleneck as well.

We introduce FQ scheduler 303 in the system to control the rate of accepting requests of each class (i.e., the relative dequeue rates from per-class accept queues 302). The standard Linux kernel is modified such that each class is assigned a weight, which decides the rate of accepting requests of that class. This embodiment focuses on how to assign those weights using a feedback control scheme to achieve the desired per-class average delay in the face of varying input load.

The algorithm used by the FQ scheduler is start-time fair queueing (SFQ). Basically, each class is assigned a weight. When a connection enters one of the accept queues, a start tag is associated with it. Its value depends on the weight assigned to the class to which this connection belongs. The connections are subsequently accepted in the increasing order of these tags. SFQ has a proven property that the rate of connections accepted from a class is proportional to its weight. The weight assignment is performed at the user-level by the algorithm described below. To facilitate weight assignment, the kernel maintains for each class the measured queueing delay, request arrival rate, and request service rate.

Figure 4:
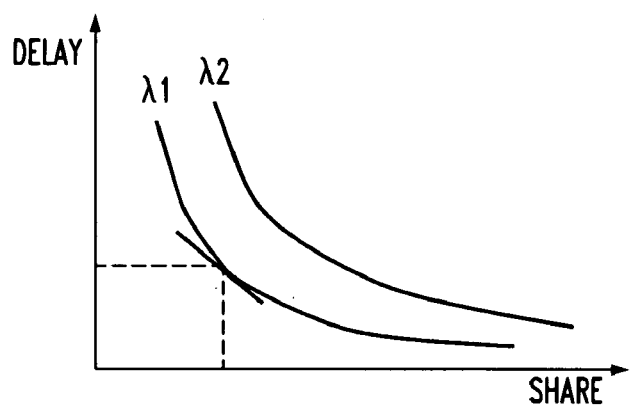
FIG. 4 illustrates a relationship between delay and share, according to an embodiment of the invention.

In addition, the expected queueing delay of a class is determined by the request arrival rate λ of that class and its share of the processing resources. As discussed above, the share of resources given to each class is determined by its weight. For a particular request arrival rate, the queuing delay of a class decreases when it is allocated more shares of resources. Moreover, the effect of the resource share on the queueing delay becomes less prominent as a class receives more shares of resources. When the request arrival rate changes, the relationship between the delay and the resource share also changes. To illustrate this, FIG. 4 shows the share-delay curves corresponding to two different arrival rates.

The simplest feedback-based weight adaptation algorithm continuously keeps track of the operating point of each class on such a curve, and approximates the small segment of the curve around the operating point with a line. In control theoretic terms, this slope is the process gain. It determines the change in output (class delay) as a function of the change in input (class weight). A weight adjustment is then calculated for each class based on this approximated linear relationship such that under the new weight, class output (delay) is set exactly equal to the set point. This algorithm is invoked every adaptation interval, which is a fixed predetermined quantity. Every time it is invoked, the algorithm executes the following steps (where k is the invocation number):

1. For each class i, query the kernel for its delay during the kth interval: $d_{i,k}$.

2. Since the request arrival rate is not constant, the measurement of the delay could be quite noisy. To avoid reacting to the noise and unnecessary weight adjustment, an exponential weighted moving average (EWMA) filter is introduced to smooth the measurement. For each class i, feed its delay $d_{i,k}$, into a EWMA filter. Denote the filter output as $D_{i,k}$. The expression for $D_{i,k}$ is:

$$D_{i,k} = \alpha \times D_{i,k-1} + (1-\alpha) \times d_{i,k}, \quad (1)$$

where $D_{i,k-1}$ is the filter output for class i during the k−1 interval, and α is a configurable parameter controlling the smoothing effect.

3. For each class, calculate its slope as follows:

$$slope_i = \frac{D_{i,k} - D_{i,k-1}}{share_{i,k} - share_{i,k-1}}, \quad (2)$$

where $share_{i,k}$, and $share_{i,k-1}$ are the shares for class i, during the kth and k−1th interval, respectively.

4. For class i, calculate its share during the k+1th interval as follows:

$$share_{i,k+1} = share_{i,k} + \frac{goal_i - D_{i,k}}{slope_i}, \quad (3)$$

where $goal_i$ is the queueing delay goal for class i.

5. Notify the kernel to adjust the shares.

The algorithm assumes that the workload is within the system's capacity.

Figure 5:
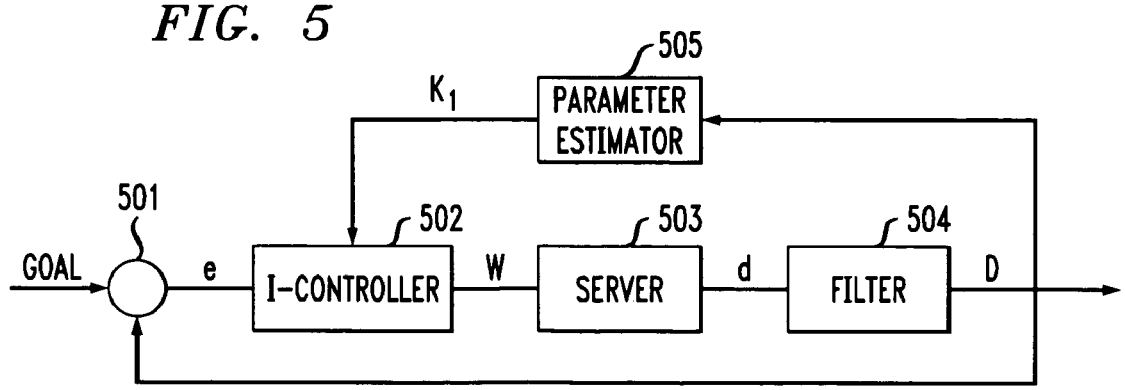
FIG. 5 illustrates a feedback control queuing system, according to an embodiment of the invention.
Figure 6:
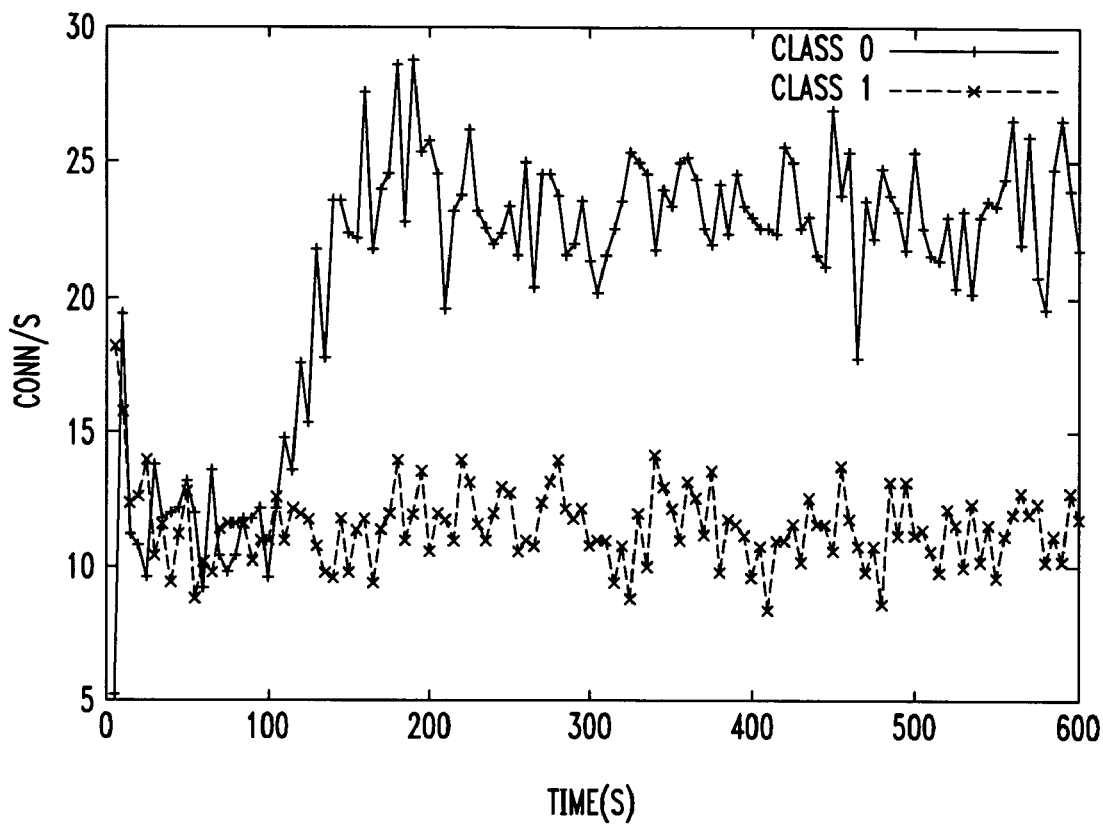
FIG. 6 illustrates a connection rate of two classes, according to an embodiment of the invention.

We now analyze the above adaptation algorithm from the perspective of control theory. In the analysis, we only focus on one class i, therefore omit the subscript i in the formulas. The algorithm can be modeled as a control loop as depicted in FIG. 5 including adder (summation point) 501, controller 502, server 503, filter 504 and parameter estimator 505. Recall that for a given class, the algorithm approximates its nonlinear share-delay relationship with piecewise linear segments. Therefore, we can model a queue around an operating point as a linear system. In the time domain, its model is:

$$delay = slope \times share + c. \quad (4)$$

In the z-domain, the transfer function is $G_p$=slope. The weight adjustment (equation (3)) can be modeled by a classic integral controller, whose transfer function in the z-domain is:

$$G_c = K_1 \times \frac{z}{z-1}, \quad (5)$$

where $$K_1 = \frac{1}{slope}. \quad (6)$$

The parameter estimator estimates $K_1$. And a EWMA filter (equation (1)) is equivalent to a 1st order low-pass filter, whose z-domain transfer function is:

$$G_f = z \times \frac{1-\alpha}{z-\alpha}. \quad (7)$$

If we consider the system operating around an operating point (i.e., a given arrival rate and service rate) during a small period, thus ignoring the parameter estimator, the closed-loop transfer function is:

$$\frac{G_c \times G_p \times G_f}{1 + G_c \times G_p \times G_f} = \frac{(1-\alpha)z^2}{(2-\alpha)z^2 - (1+\alpha)z + \alpha}. \quad (8)$$

Notice that $$G_p \times G_c = \frac{z}{z-1}$$

and slope is no longer in the closed-loop transfer function. Thus, if the slope estimation accurately describes a linearization around the operating point, then the closed-loop function only depends on α. Also, the distribution of the arrival process does not appear in the model either. This is exactly the superiority of feedback control: it does not demand an accurate model and is quite robust in the face of disturbance and uncertainty.

While the above control loop should eventually converge to the right resource allocation and achieve the desired delay, an experimental investigation reveals undesirable interactions between the feedback controller and the SFQ scheduler. Control of the SFQ scheduler is therefore given a closer look. We first discuss the effects of the two key parameters of feedback control of the SFQ scheduler; the α parameter of the EWMA filter and the adaptation interval. A departure is shown from theoretic expectations. The departure is explained by an interaction between the scheduler and the controller that leads to loop instability and general performance degradation. This interaction is modeled and analyzed from a control theory perspective, followed by solutions that achieve good performance. It is believed that the results, pitfalls, and insights illustrated herein below are directly applicable to any implementation of a FQ element in which weights are dynamically adjusted using feedback control.

The experimental testbed consists of three machines connected by a 100 Mbps Ethernet. The server is a 550 MHz P-III machine with 256 MB RAM and runs the patched kernel. The server runs Apache web server 1.3.19, and the MaxClient parameter of Apache is set to 300 processes. Each client machine has a 550 MHz P-III CPU and 256 MB RAM, and runs Linux 2.4.7. SURGE (Paul Barford and Mark Crovella, "Generating representative web workloads for network and server performance evaluation," In Measurement and Modeling of Computer Systems, pp. 151-160, 1998) is used to generate the HTTP/1.1 workload. We choose SURGE because it is widely considered a realistic and representative web workload, so positive results under this workload should carry over to many situations. The requested content is dynamically generated by a common gateway interface (CGI) script at the server side. The CGI script first sleeps for some time before sending back the reply. The sleep time follows a uniform distribution U(0, 50 milliseconds). It simulates the time it takes to query the database or application server. The purpose is to stress the accept queue without loading the CPU.

We modify SURGE so that the number of simulated clients can be dynamically changed. Throughout the experiment, two classes of clients are simulated. Originally, each class has 100 clients. During 100 seconds (s) to 200 s, the client number of class 0 increases linearly from 100 to 300, and remains at 300 for the rest of the experiment. The client number of class 1 does not change. The connection rates of the two classes are plotted in FIG. 6. This workload simulates an abrupt traffic increase. The delay goals for the two classes are 1 s and 20 s, respectively.

As seen above, the EWMA filter is equivalent to a 1st order low pass filter. Control theory tells us that 1st order low pass filters can introduce lags, thus slowing down the response of a system. The degree of the slowdown depends on the value of $\alpha$. From Equation 7, we see that the filter adds a pole to the system at $\alpha$, thus a smaller value of $\alpha$ will result in a faster system.

The problem we face is that $\alpha$ cannot be arbitrarily small, since a smaller $\alpha$ also lets more noise enters the system. The proper value should therefore be chosen based on the noise level, which is related to the variability in system load. System load in most Internet servers is highly variable, necessitating a fairly large $\alpha$, and thereby resulting in a slower control system response.

Figure 7:
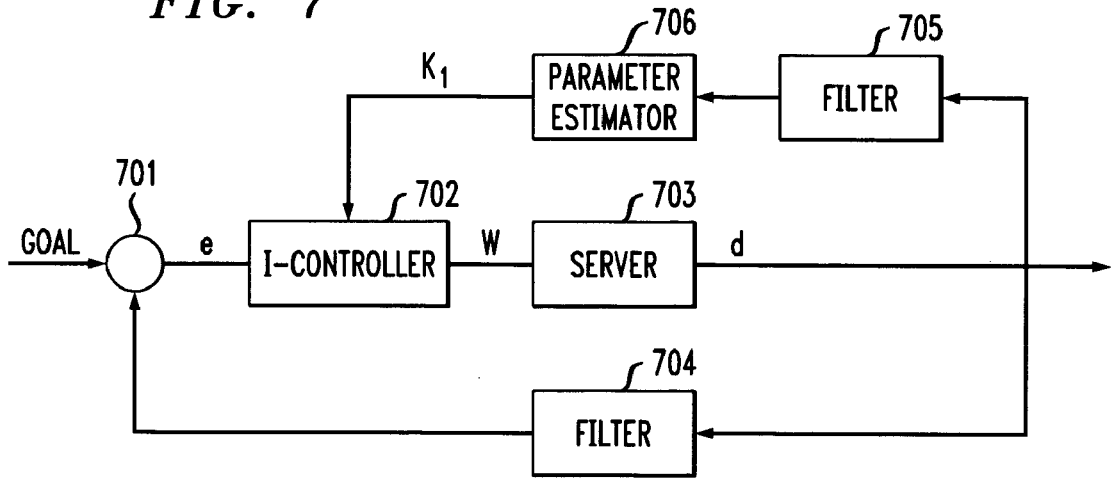
FIG. 7 illustrates a feedback control queuing system, according to another embodiment of the invention.
Figure 8:
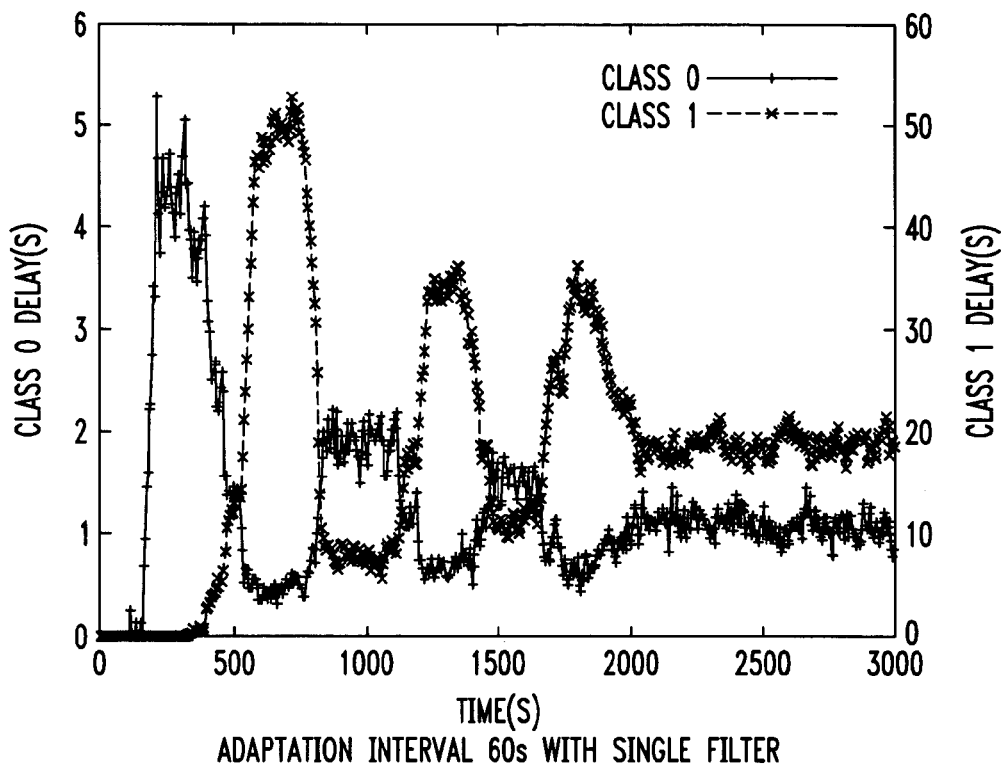
FIGS. 8A and 8B illustrate filter effects associated with an adaptation interval, according to an embodiment of the invention.
Figure 8:
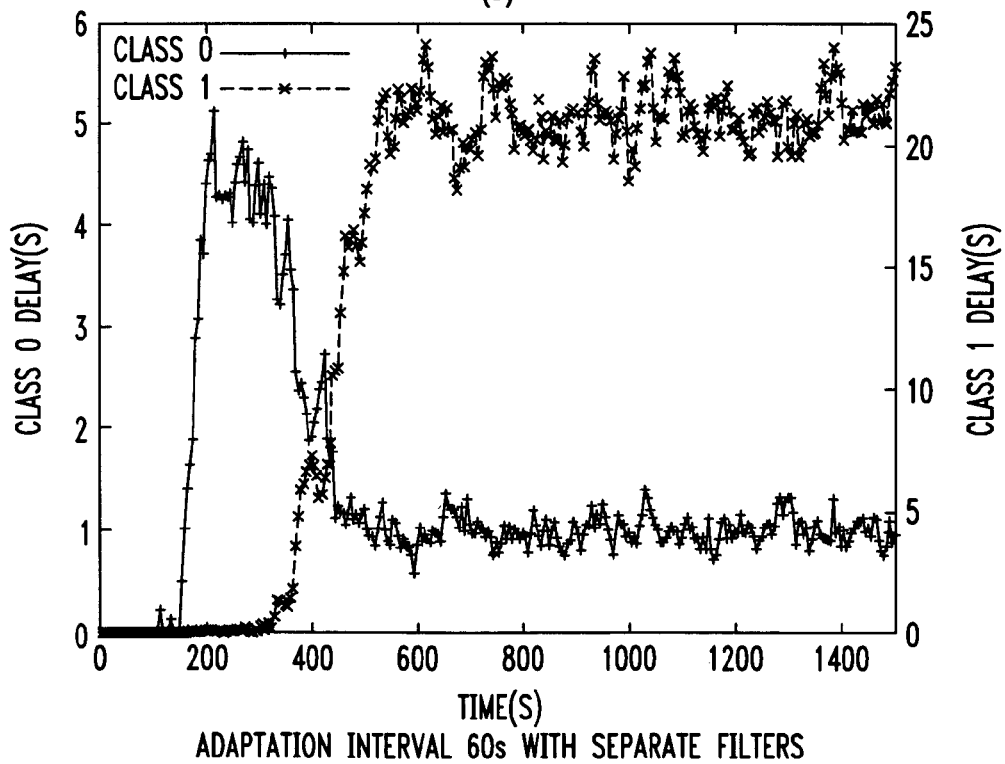

To overcome this problem, we use a separate filter for the feedback and the parameter estimation. The filter for the feedback path has a smaller $\alpha$: 0.3, to improve the responsiveness. The filter for the parameter estimation uses a larger $\alpha$: 0.5, to reject noise. FIG. 7 shows the new structure including adder (summation point) 701, controller 702, server 703, filter 704, filter 705, and parameter estimator 706.

We then set the adaptation interval to 60 s, and perform the experiment using the old filter structure (FIG. 5) and the new filter structure (FIG. 7), respectively. The behavior of the old and new system is plotted in FIGS. 8A and 8B, respectively. Comparing the two, the new system settles down much faster than the old one. The settling time is reduced from 2000 s to 500 s.

Another key parameters of the algorithm is the adaptation interval, which in control terminology is called the sampling period. As seen above, the settling time depends on the EWMA parameter $\alpha$. In particular, $\alpha$ determines the number of sampling periods it takes for the system to settle. Expressed in absolute time units, the settling time is given by the number of periods S multiplied by the length of the period. Hence, given a fixed $\alpha$, a smaller sampling period should, in principle, lead to a faster absolute settling time. We conduct an experiment to verify this assertion.

Figure 9:
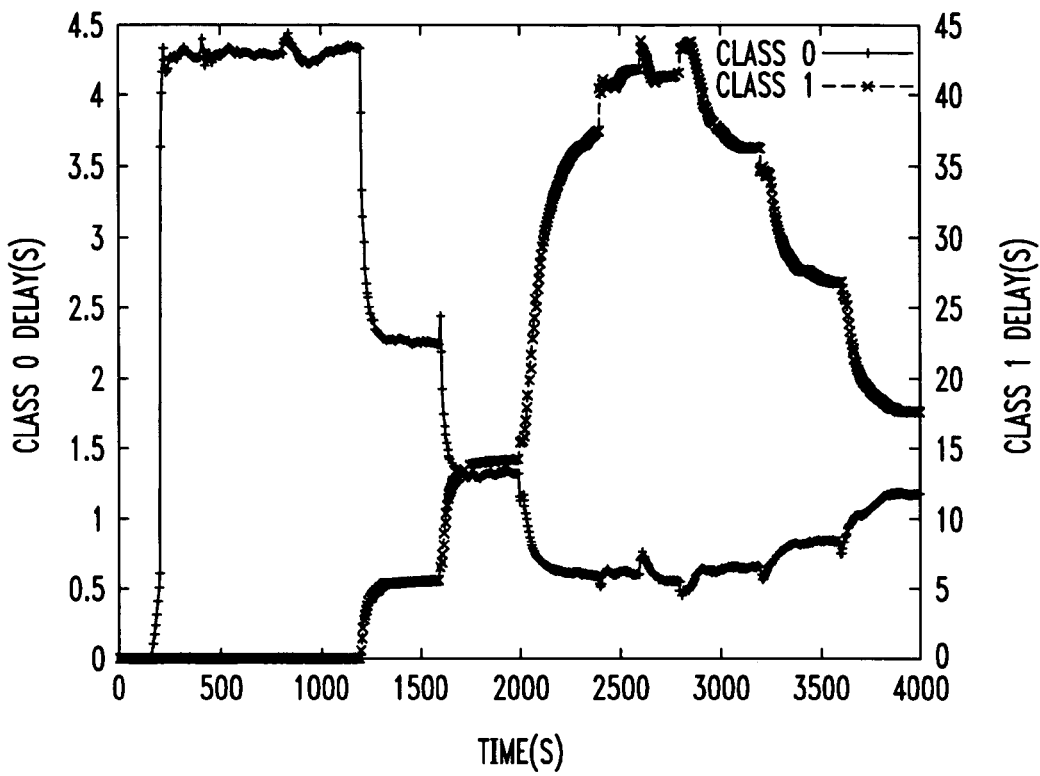
FIG. 9 illustrates filter effects associated with an adaptation interval, according to another embodiment of the invention.

Let us set the sampling period to a large value of 400 s. As expected, this conservative setting results in a very slow transient response. As shown in FIG. 9, it takes the system almost 1 hour (3500 s) to settle down.

We now reduce the sampling period in the experiments. We are interested in two questions, namely: (1) 1 s the change of the settling time proportional to the change of the adaptation interval as postulated from the theoretical analysis? For example, if the adaptation interval is reduced by half, will the settling time also be reduced by half? (2) What happens when the adaptation interval is very short? Does it introduce any side effects to the system? In other words, is there any lower bound on the adaptation interval?

We have already seen the result of using an adaptation interval of 60 s in FIG. 8A. Not surprisingly, the smaller adaptation interval does improve the performance: the settling time is reduced to 2000 s. But, this improvement is relatively small compared with the change of the adaptation interval. The adaptation interval is reduced to ⅙ of the original value (from 400 s to 60 s), but the settling time is only reduced by half.

Figure 10:
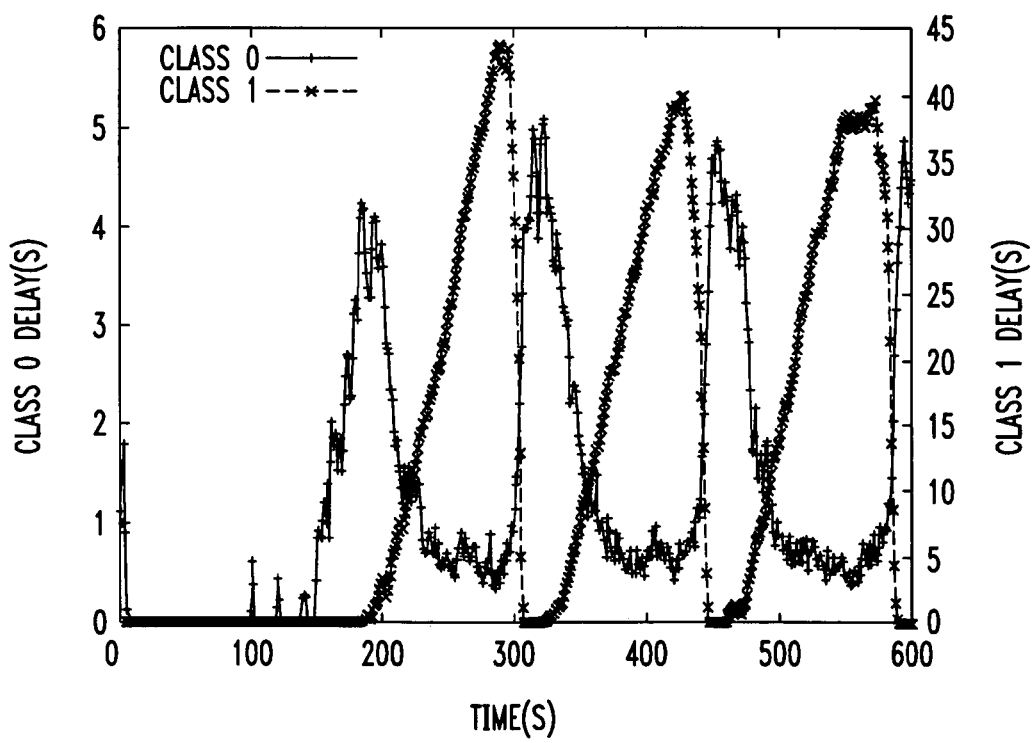
FIG. 10 illustrates filter effects associated with an adaptation interval, according to yet another embodiment of the invention.
Figure 11:
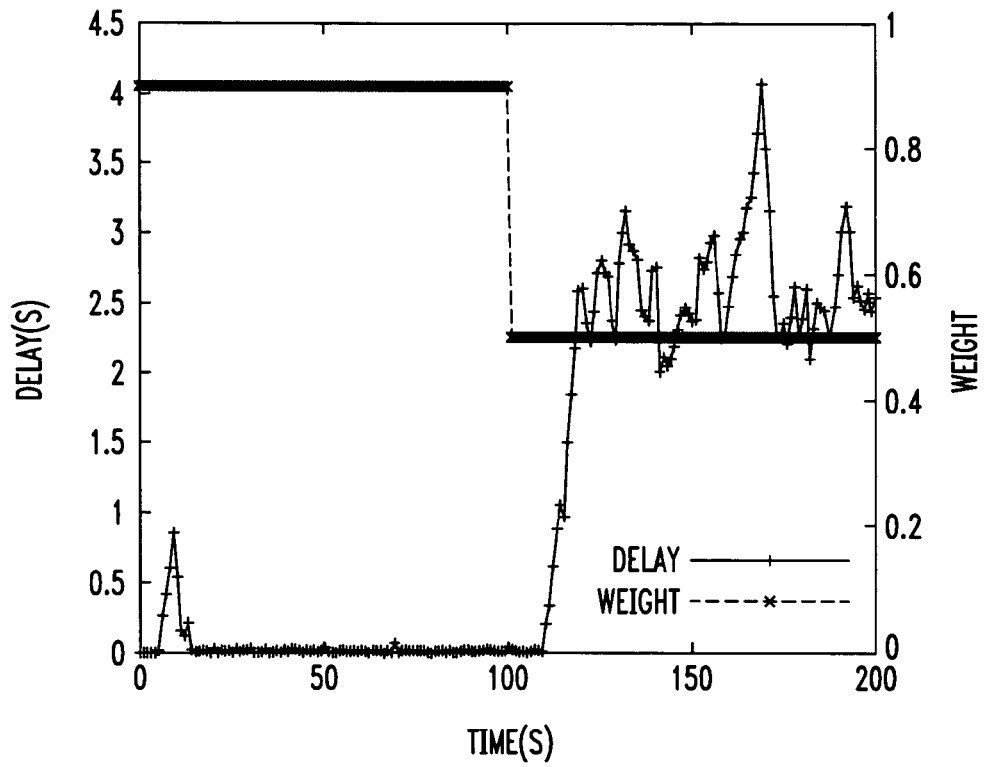
FIG. 11 illustrates evidence of deadtime, according to an embodiment of the invention.

Then, we repeat the experiment using a more aggressive adaptation interval: 10 s. This time the system enters an oscillatory state and cannot settle down, as shown in FIG. 10. The experiment is repeated using the multi-filter structure. The system is still unstable.

Two interesting observations can be made from these experiment results: (1) Using a smaller adaptation interval does improve the system's responsiveness. But the improvement is limited. (2) There does exist some lower bound of the adaptation interval. When the interval is too small, the system can become unstable. Both of these observations are at odds with Equation (8), which implies other hidden factors are affecting the system's stability.

According to control theory, the stability of a system depends on the pole positions of its closed loop transfer function. Observe that in Equation (8), only $\alpha$ appears in the denominator, which means that only $\alpha$ can affect the stability of the system. The fact that a small adaptation interval can lead to instability even if $\alpha$ is not changed implies that the system's model (i.e., the transfer function) changes in the case of a small adaptation interval. The closed loop system of Equation (8) consists of three parts: an accept queue including its scheduler, an EWMA filter, and an integral controller. The behavior of the EWMA filter and the integral controller is well understood, therefore, we turn our attention to the accept queue, especially the scheduler associated therewith.

The accept queue scheduler implements the SFQ algorithm. Recall that the SFQ algorithm schedules connections according to the values of the start tags. Since the tag is assigned when a connection first enters the queue and its value is decided by the weight of the class this connection belongs to at that moment, any further weight changes have no influence over the connections already in the queues. In other words, the new weight change will not take effect until the connections currently in the queues are all accepted. Here we call the time it takes the system to drain the backlog deadtime.

The existence of deadtime is exposed by a small experiment. The weights are initially 0.9 for class 0 and 0.1 for class 1. After the system stabilizes, at time 100 s, the weights for both classes are changed to 0.5. The weight and delay for class 0 are plotted in FIG. 11. Since the weight for class 0 drops, the delay experienced by class 0 increases. But the increase does not happen immediately after the weight is changed. Rather, it happens more than 10 s after the weight is adjusted. This 10 s delay is the deadtime.

Under normal situations, the deadtime is very short and, thus, does not become a problem. When the workload is high, the deadtime can be as long as several seconds as shown in the above small example. If the adaptation interval is comparable to the deadtime, the effect of the deadtime on the behavior of the system can no longer be ignored, thus must be taken into account.

Simulation is used to show the effect of the deadtime on the system. $K_I$ and $\alpha$ are set to $-16$ and $0.3$, respectively. The server model is $$-\frac{1}{16} \times \frac{1}{z^2}.$$

Figure 12:
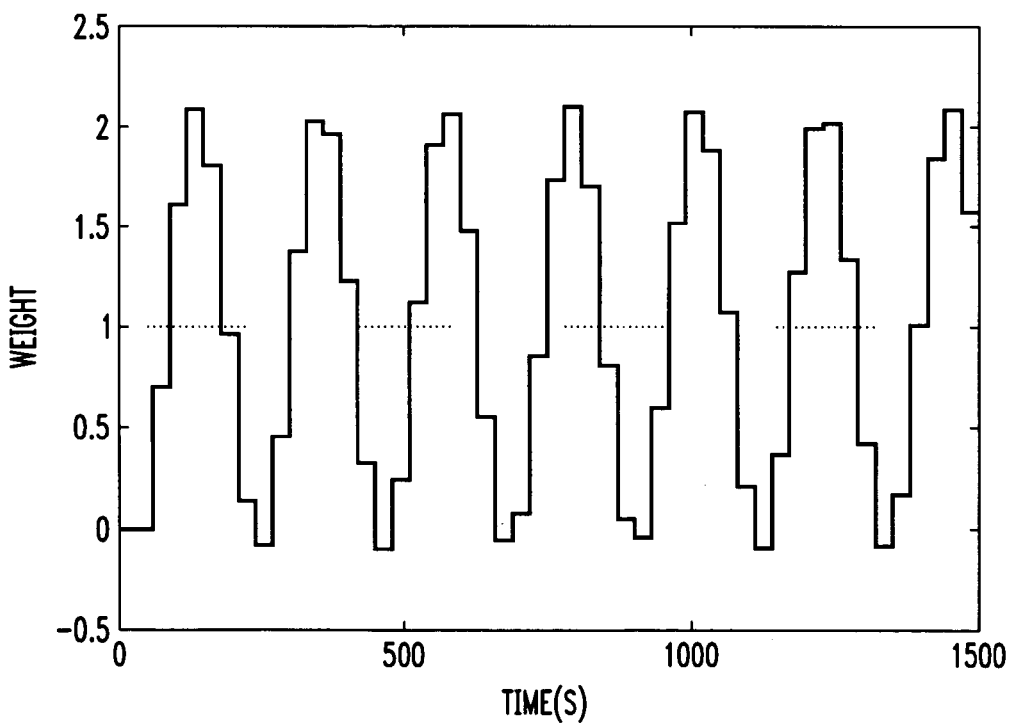
FIG. 12 illustrates a simulation of the effect of deadtime, according to an embodiment of the invention.
Figure 13:
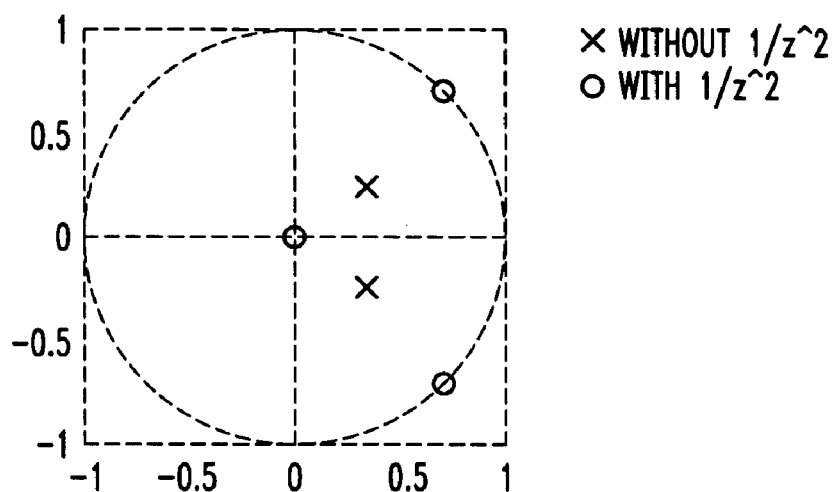
FIG. 13 illustrates filter pole positions, according to embodiments of the invention.

The extra term $$\frac{1}{z^2}$$

represents a deadtime of two adaptation intervals. The response of the system toward a step input is shown in FIG. 12. The behavior clearly indicates an unstable state. According to control theory, a system is stable if its poles are all within the unit circle. FIG. 13 compares the poles of the system with and without the extra $$\frac{1}{z^2}$$

term. When the extra term is added, the poles are moved from within the unit circle, which is the stable region, to the boundary of the unit circle, which is the unstable region.

How the deadtime gives birth to the oscillation can be intuitively explained as follows. Suppose that now the delay of class 0 is higher than its goal. The adaptation algorithm increases the weight for class 0. After 10 seconds, the adaptation algorithm expects to observe immediate result due to this weight increase, i.e., reduced queueing delay, and makes further adjustment based on the observation. Because of the deadtime, however, this expected delay reduction does not show up after 10 seconds. Therefore, the adaptation algorithm has to further increase the weight for class 0. This keeps happening until the queueing delay for class 0 drops. But by then, it is too late. All the weight increases applied have already had a cumulative effect on the system, and the weight for class 0 is much more than needed. The direct result is that class 1 begins to suffer. Then the same process happens to class 1. This forces the system into an oscillatory state.

There are basically three ways to fix the problem. (1) Fix the implementation of SFQ such that the new weight change updates the start tags of those requests already in the queues. (2) Enrich the server model to take into account the deadtime. (3) Adopt variable adaptation intervals so that the deadline becomes invisible to the adaptation algorithm.

The first option is inefficient because it implies changing the logical timestamp of all enqueued requests at every sampling time, which introduces high overhead. The second option is viable, but requires more sophisticated control derived using more advanced results in control theory that pertain to systems with variable delay. We choose the third option due to its simplicity. It provides a straightforward solution that is able to maintain the simplicity of the feedback controller while achieving the needed performance. It is to be understood that the third option is an example of the concept illustrated above in the context of the FIFO queue in FIG. 2.

Figure 14:
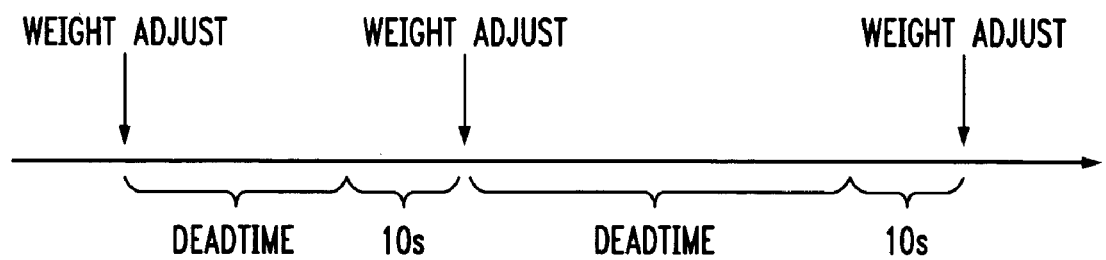
FIG. 14 illustrates a variable adaptation interval, according to an embodiment of the invention.
Figure 15:
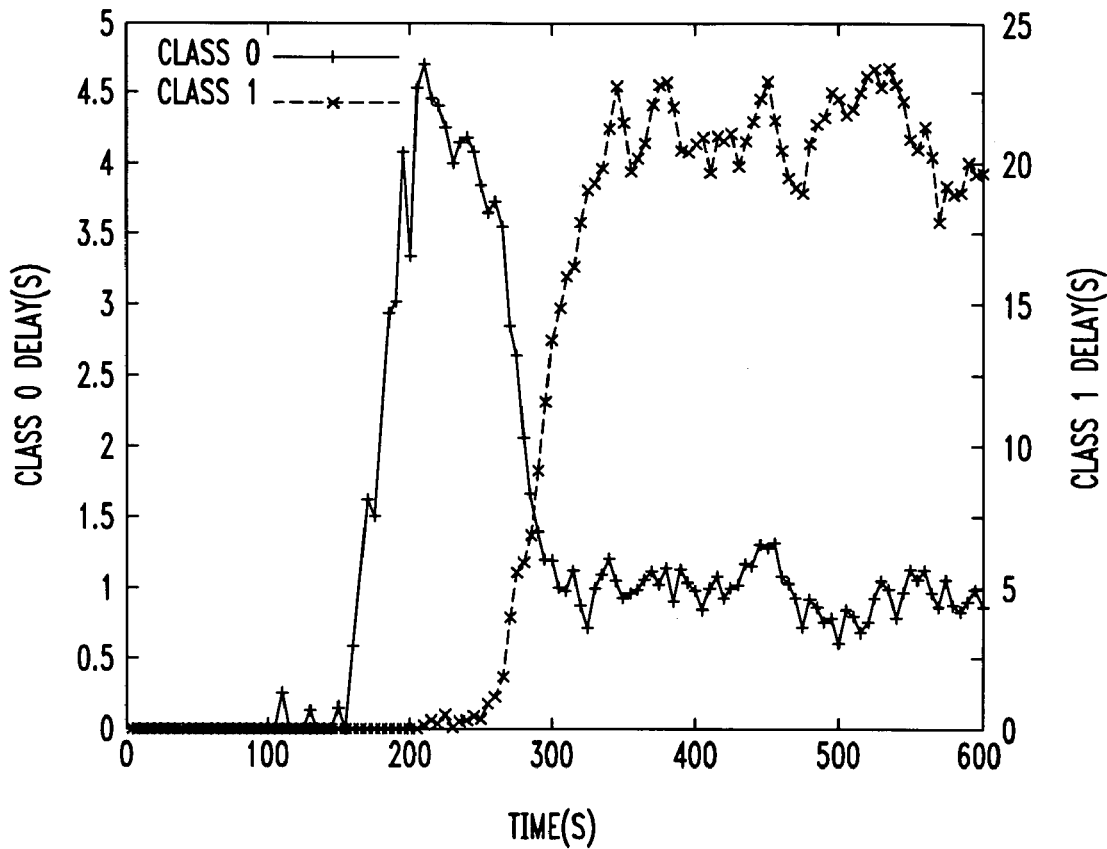
FIG. 15 illustrates a variable adaptation interval, according to embodiments of the invention.

To support variable adaptation intervals, one more per-class measurement has to be maintained by the kernel: the accept queue length. When the adaptation algorithm changes the weight, it also records the current length of the queue for each class, i.e., the backlog size. After that, every second the adaptation algorithm queries the kernel for the number of requests accepted. It keeps querying until the backlog of all the queues are cleared, which means the end of the deadtime. Then it waits for the desired adaptation interval before it changes the weight again. Since the deadtime is not a fixed value, the actual adaptation interval is also variable: the deadtime plus the desired fixed adaptation interval, as shown in FIG. 14.

We set the desired adaptation interval to 10 s, and repeat the experiment using this new algorithm. The response of the system is plotted in FIG. 15. The most obvious improvement over FIG. 10 is that the system is stable in this case. Compared with the case of 60 s adaptation interval (FIG. 8B), the settling time is reduced to 200 s from 350 s. This improvement is not as drastic as when the adaptation interval is changed to 60 s from 400 s. The reason is that the deadtime now becomes a major contributor to the settling time, and there is no way to reduce the deadtime unless we change the implementation of the scheduler. The latter option, however, may invalidate the set of convenience properties we know about the SFQ scheme, which represent the main advantages of that policy.

Figure 16:
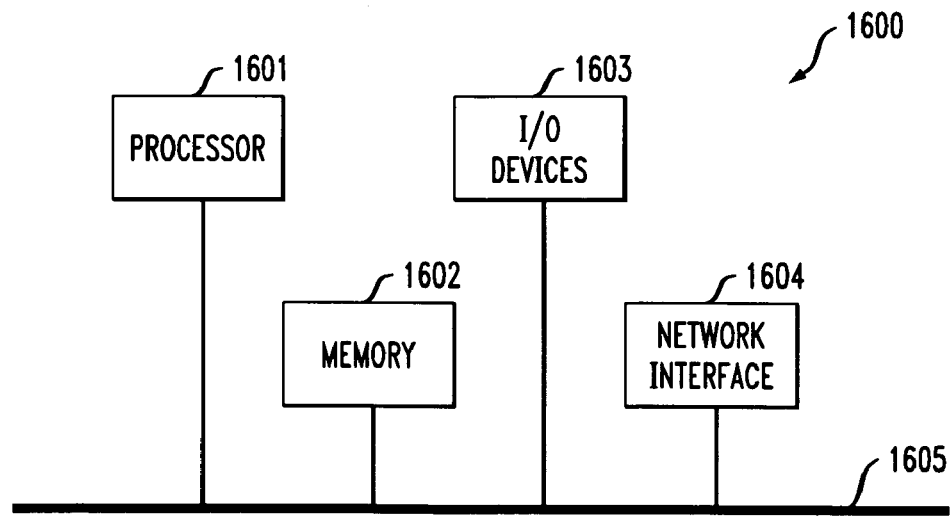
FIG. 16 illustrates a computing system architecture in which techniques of the invention can be implemented.

FIG. 16 illustrates an illustrative embodiment of a computing system wherein principles of the invention may be implemented. That is, computing system 1600 represents a computing system in accordance with which one or more components/steps of the feedback control queuing system described herein (e.g., components and methodologies described in the context of FIGS. 1 through 15) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 16 may represent one or more managed systems or one or more resource managers capable of providing all or portions of the functions described herein. Also, it is contemplated that a resource manager and a managed system may reside on one such computing system.

As shown, the computing system architecture includes a processor 1601, a memory 1602, I/O devices 1603, and a network interface 1604, coupled via a computer bus 1605 or alternate connection arrangement.

It is to be appreciated that the term "processor" as used herein is intended to include any processing device, such as, for example, one that includes a CPU and/or other processing circuitry. It is also to be understood that the term "processor"

may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing one or more queuing elements associated with a class, comprising the steps of:
    recording a current length of each of the one or more queuing elements associated with the class when a weight associated with the class is changed; and
    waiting a time period before the weight associated with the class is changed again, the waiting time period comprising a combination of a variable time period for requests attributed to the current length of each of the one or more queuing elements to be cleared and a fixed adaptation time period.

2. The method of claim 1, wherein the one or more queuing elements comprise one or more fair queuing (FQ) elements.

3. Apparatus for managing one or more queuing elements associated with a class, comprising:
    a memory; and
    at least one processor coupled to the memory and operative to: (i) record a current length of each of the one or more queuing elements associated with the class when a weight associated with the class is changed; and (ii) wait a time period before the weight associated with the class is changed again, the waiting time period comprising a combination of a variable time period for requests attributed to the current length of each of the one or more queuing elements to be cleared and a fixed adaptation time period.

4. The apparatus of claim 3, wherein the one or more queuing elements comprise one or more fair queuing (FQ) elements.

5. A computer program product comprising a tangible computer readable recordable storage medium including computer usable program code for managing one or more queuing elements associated with a class, the computer program product comprising computer usable program code for performing steps of:
    recording a current length of each of the one or more queuing elements associated with the class when a weight associated with the class is changed; and
    waiting a time period before the weight associated with the class is changed again, the waiting time period comprising a combination of a variable time period for requests attributed to the current length of each of the one or more queuing elements to be cleared and a fixed adaptation time period.

6. The computer program product of claim 5, wherein the one or more queuing elements comprise one or more fair queuing (FQ) elements.

7. A method of providing a resource manager for managing one or more queuing elements associated with a class, comprising the step of:
    providing a resource manager for: recording a current length of each of the one or more queuing elements associated with the class when a weight associated with the class is changed, and waiting a time period before the weight associated with the class is changed again, the waiting time period comprising a combination of a variable time period for requests attributed to the current length of each of the one or more queuing elements to be cleared and a fixed adaptation time period.

8. The method of claim 7, wherein the one or more queuing elements comprise one or more fair queuing (FQ) elements.

* * * * *